(12) United States Patent
MacInnis et al.

(10) Patent No.: US 7,924,345 B2
(45) Date of Patent: *Apr. 12, 2011

(54) METHOD AND SYSTEM FOR DEINTERLACING USING POLARITY CHANGE COUNT

(75) Inventors: Alexander MacInnis, Lake Oswego, OR (US); Chenhui Feng, Sunnyvale, CA (US)

(73) Assignee: Broadcom Corp.

( * ) Notice: Subject to any disclaimer, the term of this patent is extended or adjusted under 35 U.S.C. 154(b) by 1180 days.

This patent is subject to a terminal disclaimer.

(21) Appl. No.: 11/254,262

(22) Filed: Oct. 20, 2005

(65) Prior Publication Data

US 2007/0091205 A1   Apr. 26, 2007

(51) Int. Cl.
*H04N 7/01* (2006.01)
*H04N 11/20* (2006.01)
*H04N 5/00* (2006.01)
*H04N 5/21* (2006.01)
*H04N 9/64* (2006.01)
*H04N 9/78* (2006.01)

(52) U.S. Cl. ........ 348/448; 348/449; 348/452; 348/607; 348/629; 348/665; 348/700; 348/701

(58) Field of Classification Search ................... 348/448, 348/449, 451, 452, 607, 625, 623, 628, 669, 348/665, 666, 700, 701

See application file for complete search history.

(56) References Cited

U.S. PATENT DOCUMENTS

| | | | | |
|---|---|---|---|---|
| 5,365,273 | A | * | 11/1994 | Correa et al. ............... 348/452 |
| 5,452,011 | A | * | 9/1995 | Martin et al. ............... 348/526 |
| 5,563,651 | A | * | 10/1996 | Christopher et al. ........... 348/97 |
| 6,052,414 | A | * | 4/2000 | Lee et al. ................ 375/240.16 |
| 6,133,957 | A | * | 10/2000 | Campbell ...................... 348/458 |
| 6,201,577 | B1 | * | 3/2001 | Swartz .......................... 348/558 |
| 6,262,773 | B1 | * | 7/2001 | Westerman .................. 348/448 |
| 6,414,719 | B1 | * | 7/2002 | Parikh ........................... 348/448 |
| 6,459,455 | B1 | * | 10/2002 | Jiang et al. ................... 348/452 |
| 6,459,734 | B1 | * | 10/2002 | Kato et al. ................ 375/240.12 |
| 6,567,468 | B1 | * | 5/2003 | Kato et al. ................ 375/240.12 |
| 6,647,062 | B2 | * | 11/2003 | Mackinnon ............. 375/240.16 |
| 6,690,427 | B2 | * | 2/2004 | Swan ............................. 348/448 |
| 6,795,123 | B2 | * | 9/2004 | Gotanda et al. ............... 348/448 |
| 7,057,664 | B2 | * | 6/2006 | Law et al. ..................... 348/448 |
| 7,075,581 | B1 | * | 7/2006 | Ozgen et al. .................. 348/448 |
| 7,129,989 | B2 | * | 10/2006 | Chen et al. .................... 348/448 |
| 7,154,556 | B1 | * | 12/2006 | Wang et al. ................... 348/452 |
| 7,206,028 | B2 | * | 4/2007 | Yeh et al. ...................... 348/448 |
| 7,286,185 | B2 | * | 10/2007 | Wong et al. ................... 348/452 |
| 7,324,163 | B2 | * | 1/2008 | Bacche ......................... 348/663 |
| 7,349,029 | B1 | * | 3/2008 | Chou ............................ 348/448 |
| 7,382,417 | B2 | * | 6/2008 | Caviedes ...................... 348/700 |

(Continued)

*Primary Examiner* — Brian Yenke

(74) *Attorney, Agent, or Firm* — McAndrews, Held & Malloy, Ltd.

(57) ABSTRACT

A method for processing video information may include calculating a polarity change count (PCC) for a plurality of pixel pairs selected from a plurality of pixels from different fields utilizing a plurality of difference polarity values associated with the plurality of pixel pairs. At least a portion of the plurality of pixels from different fields may be deinterlaced based on at least the calculated PCC. The plurality of difference polarity values may be calculated for the plurality of pixel pairs selected from the plurality of pixels from different fields. At least one difference in amplitude of at least one of the selected pixel pairs may be calculated for the calculating the plurality of difference polarity values. The plurality of pixels from different fields may comprise a plurality of adjacent pixels from a plurality of woven fields.

30 Claims, 16 Drawing Sheets

U.S. PATENT DOCUMENTS

| | | | |
|---|---|---|---|
| 7,388,617 B2 * | 6/2008 | Kasahara et al. | 348/448 |
| 7,405,766 B1 * | 7/2008 | Chou et al. | 348/448 |
| 7,414,671 B1 * | 8/2008 | Gallagher et al. | 348/625 |
| 7,538,824 B1 * | 5/2009 | Pillay et al. | 348/701 |
| 2002/0054236 A1 * | 5/2002 | Wredenhagen et al. | 348/452 |
| 2002/0105596 A1 * | 8/2002 | Selby | 348/699 |
| 2005/0212961 A1 * | 9/2005 | Matsuzaki et al. | 348/452 |
| 2006/0039590 A1 * | 2/2006 | Lachine et al. | 382/128 |
| 2006/0164559 A1 * | 7/2006 | Chou et al. | 348/700 |
| 2007/0030384 A1 * | 2/2007 | Wredenhagen et al. | 348/449 |
| 2008/0036908 A1 * | 2/2008 | Wong et al. | 348/448 |

* cited by examiner

METHOD AND SYSTEM FOR DEINTERLACING USING POLARITY CHANGE COUNT

RELATED APPLICATIONS

This application is related to the following applications, each of which is hereby incorporated herein by reference in its entirety for all purposes:
U.S. patent application Ser. No. 11/254,450 filed Oct. 20, 2005;
U.S. patent application Ser. No. 11/254,455 filed Oct. 20, 2005; and
U.S. Patent Application Ser. No. 60/687,674 filed Jun. 6, 2005.

FIELD OF THE INVENTION

Certain embodiments of the invention relate to processing of video. More specifically, certain embodiments of the invention relate to a method and system for deinterlacing using a polarity change count.

BACKGROUND OF THE INVENTION

During interlacing, pictures that form a video may be captured at two distinct time intervals. These pictures, which form the video, comprise a plurality of ordered lines. During one of the time intervals, video content for even-numbered lines may be captured, while at a subsequent time interval, video content for odd-numbered lines may be captured. The even-numbered lines may be collectively referred to as a top field, while the odd-numbered lines may be collectively referred to as a bottom field. On an interlaced display, the even-numbered lines may be presented for display on the even-numbered lines of a display during one time interval, while the odd-numbered lines may be presented for display on the odd-numbered lines of the display during a subsequent time interval.

With progressive displays, however, all of the lines of the display are displayed at one time interval. During interlacing of interlaced video, a deinterlacing process may generate pictures for display during a single time interval. Deinterlacing by combining content from adjacent fields, which is known as weaving, may be suitable for regions of a picture that are characterized by little or no object motion or lighting changes, known as inter-field motion. Displaying both the top field and bottom field at the same time interval may be problematic in cases where the video content comprises significant motion or significant lighting changes. Objects that are in motion are at one position when the top field is captured and another position when the bottom field is captured. If the top field and the bottom field are displayed together, a comb-like, or jagged edge affect may appear with the object. This is referred to as a weave artifact.

Alternatively, deinterlacers may generate a picture for progressive display by interpolating missing lines in a field from adjacent and surrounding lines. This is known as spatial interpolation, or "bobbing". While spatial interpolation avoids weave artifacts in regions with inter-field motion, spatial interpolation loses vertical detail and may result in a blurry picture. Accordingly, deinterlacers commonly measure inter-field motion. In regions of a picture that are characterized by high inter-field motion, spatial interpolation is chosen, while in regions of the picture that are characterized by low inter-field motion, weaving is chosen. In some cases, high vertical detail may be mistaken for inter-field motion. Additionally, the presence of noise may also be mistaken for inter-field motion. In such cases, although a region of picture is characterized by low inter-field motion, spatial interpolation may be chosen.

Conventional methods for deinterlacing often times produce weave artifacts, which may incorrectly bias deinterlacing decisions towards weaving when spatial interpolation may be more appropriate. Similarly, these conventional deinterlacing methods may often times bias deinterlacing decisions towards spatial interpolation when weaving may be a more appropriate method for deinterlacing.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for deinterlacing using a polarity change count, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for deinterlacing interlaced video signals utilizing polarity change count (PCC). A polarity change count (PCC) may be calculated for a plurality of pixels from different fields, and the plurality of pixels from different fields may be deinterlaced based on the calculated polarity change count. For example, a low polarity change count may indicate low video motion and, therefore, adjacent video fields may be deinterlaced utilizing weaving. Similarly, a high polarity change count may indicate increased video motion and, therefore, adjacent video fields may be deinterlaced utilizing spatial interpolation. In this regard, utilizing. PCC to determine whether to deinterlace utilizing weaving and/or spatial interpolation may result in a significant reduction in bad weave artifacts in the deinterlaced video signal. In another embodiment of the invention, weaving and spatial interpolation may be blended for deinterlacing of at least a portion of the plurality of pixels from different fields. The blending may be based, for example, on the calculated PCC.

U.S. patent application Ser. No. 11/254,450 filed Oct. 20, 2005 discloses a method and system for calculating a polarity change count and is hereby incorporated herein by reference in its entirety. In an exemplary aspect of the invention, one or more of the difference polarity values utilized during PCC calculation may be limited with regard to a particular value, such as a coring value. Consequently, a particular difference polarity value, although determined, may not be included in the calculation of the polarity change count, if the selected difference value is less than the coring value.

Figure 1A:
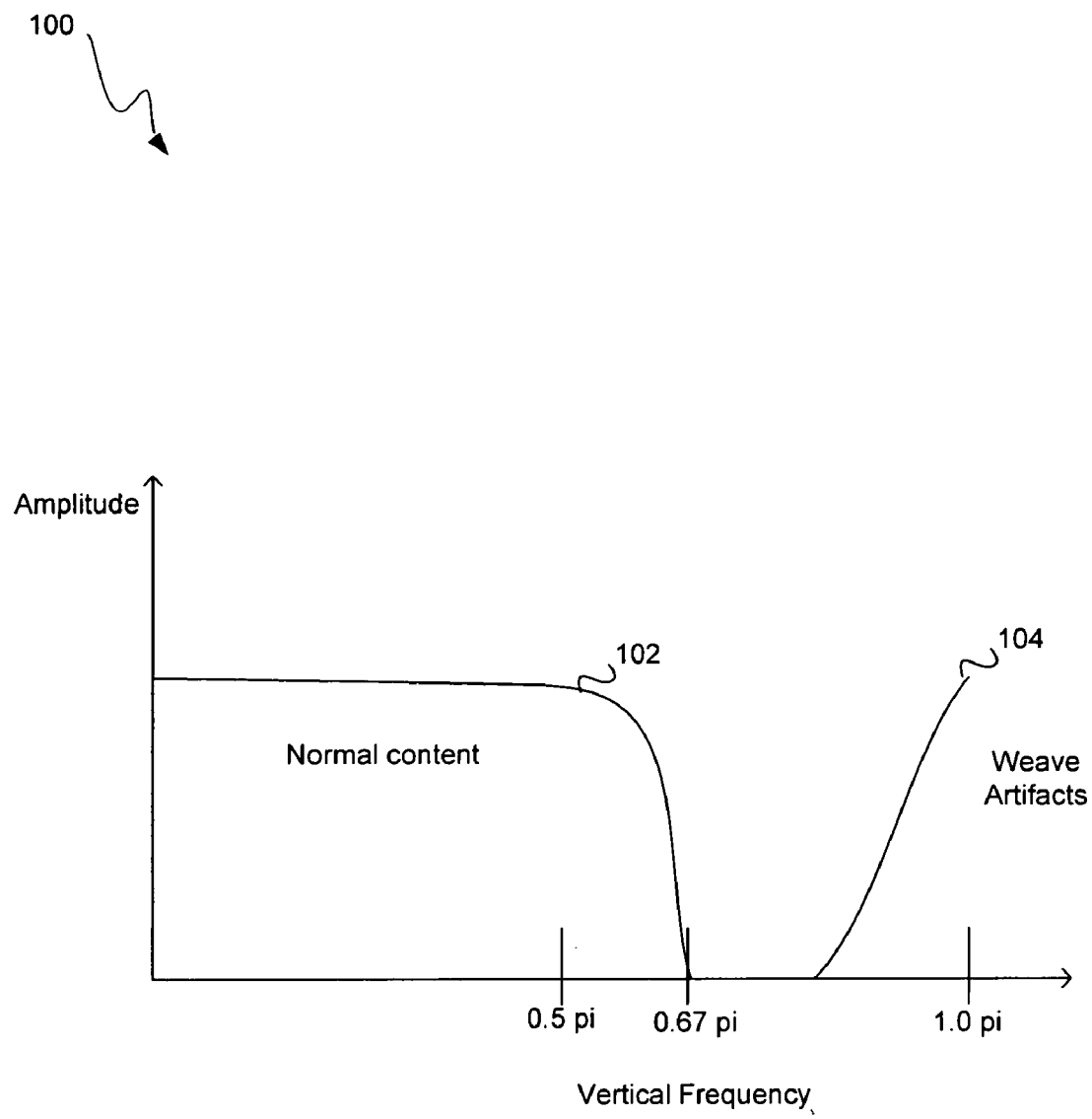
FIG. 1A is a graph illustrating exemplary spectra of video content with vertical detail and bad weave artifacts that may be utilized in accordance with an embodiment of the invention.

FIG. 1A is a graph 100 illustrating exemplary spectra of video content with vertical detail with bad weave artifacts that may be utilized in accordance with an embodiment of the invention. Referring to FIG. 1A, the exemplary spectra of video content vertical detail may comprise a normal video content vertical detail spectrum 102, and bad weave artifacts spectrum 104. The normal video content vertical detail spectrum 102 lies at a vertical frequency that is less that or equal to approximately 0.67 pi, while the bad weave artifacts spectrum 104 lies at a vertical frequency that is greater than or equal to approximately 0.8 pi.

One goal of deinterlacing is to mitigate or eliminate the bad weave artifacts spectrum 104. In an exemplary aspect of the invention, a polarity change count (PCC) may be calculated for a plurality of pixels from different fields, which may be selected from a plurality of weaved video fields. The video fields may then be deinterlaced utilizing weaving and/or spatial interpolation based on the calculated PCC so that bad weave artifacts as illustrated in the bad weave artifacts spectrum 104 may be avoided. In this regard, PCC may be calculated to detect bad weave artifacts without the need to calculate motion, and to gauge the amount of weaving that should be utilized so as to mitigate the occurrence of visible weave artifacts.

For static imagery with high vertical frequency detail but no objectionable flicker on an interlaced display, the vertical bandwidth is usually limited by the Kell factor, which may be considered to be between 0.6 and 0.7 as illustrated in FIG. 1A. That is, the maximum vertical spectral component that results in perceived detail and not perceived flicker is generally considered to be between 0.6 and 0.7 of the frame Nyquist limit. The Nyquist limit for any one field of video may be calculated as one half the frame Nyquist limit, since fields have half the vertical sample rate of frames. The frame Nyquist limit may also be referred to as 1.0 pi.

As illustrated via the bad weave artifacts spectrum 104 of FIG. 1A, bad weaves tend to produce significant spectral components at 1.0 pi. Consider, for example, the case of a white rectangular object moving against a black background, in interlaced video. In any one field, if the missing lines were filled in using the previous field, i.e. pure weaving, a distinct comb would appear at the edges of the white object, such as area 122 in FIG. 1B, which may be representative of bad weave artifacts. A vertical sequence of samples through the artifacts may comprise alternating black and white pixels, which may be indicative of a high amplitude signal at 1.0 pi. The bad weave artifacts may comprise spectral components that are higher in frequency than Kell-limited vertical detail, as illustrated in FIG. 1A.

Figure 1B:
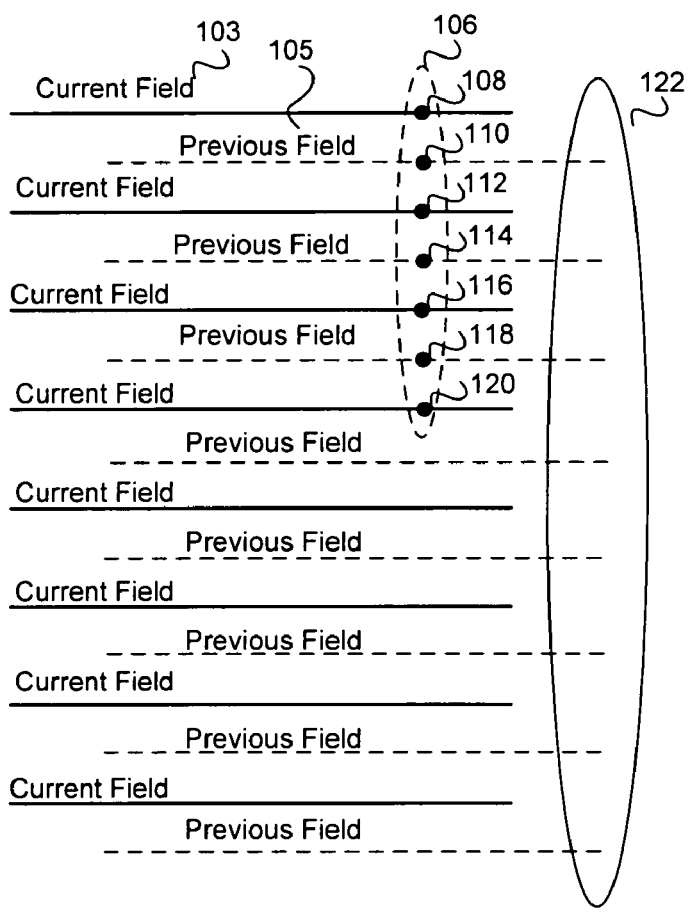
FIG. 1B is a diagram illustrating a selection of pixel samples from different fields, in accordance with an embodiment of the invention.

FIG. 1B is a diagram 130 illustrating a selection of pixel samples from different fields, in accordance with an embodiment of the invention. Referring to FIG. 1B, there is illustrated a plurality of adjacent video lines from different video fields, such as, for example, a current field 103 and a previous field 105. The current field 103 and the previous field 105 may be weaved together resulting in weave artifacts, such as artifacts 122. The weave artifacts 122 may result from horizontal motion of vertical or near vertical edges of a video field. A plurality of pixels 108, ..., 120 may be selected from adjacent video lines for comparison and calculation of a polarity change count (PCC), for example. Video lines in the current field 103 and the previous field 105 may then be deinterlaced utilizing weaving, spatial interpolation or a weighted combination of these, based on the calculated polarity change count.

Referring to FIG. 1B, weaving the two fields 103 and 105 together may produce a comb effect on both the left and right edges of the object, such as weave artifacts 122. Weaving the two fields 103 and 105 together may result in high vertical frequency spurious details in a portion of the image. The presence of such weave artifacts may indicate the combination of inter-field content motion and content detail. The spurious details may alternate in value every line and have a vertical frequency of 1.0 pi.

The bad weave artifacts, such as artifacts 122, may be equivalent to the spurious details that may result when two adjacent fields 103 and 105 are combined into one frame. In accordance with an embodiment of the invention, the degree of bad weave artifacts that may be produced in the vicinity of each output pixel if a given combination of fields were woven together may be estimated utilizing polarity change count (PCC). In this regard, weaving and spatial interpolation may be blended based on the PCC, during deinterlacing of interlaced video. Furthermore, pixel comparisons may be made and a polarity change count calculated for each group of pixels. In one aspect of the invention, a plurality of adjacent pixels 106 may be selected from the weaved previous field 105 and current field 103 for comparison. For example, the plurality of pixels 106 may comprise a current pixel 114 and pixels 110 and 118 from the current field 105, as well as pixels 108, 112, 116, and 120 from the previous field 103.

In this regard, a difference polarity may be calculated for each adjacent pair of pixels selected from the plurality of pixels 106. A polarity change count (PCC) may then be calculated by counting the number of reversals of the difference polarities between successive pairs, such as pairs (108, 110), (110, 112), . . . , (118, 120) of adjacent pixels 106. The adjacent pixels 106 may be selected so that an even number of pixels may be selected from the current field and an odd number of pixels may be selected from the previous, or an alternate field. The PCC may be adapted to function as a sensitive and reasonably accurate frequency detector that may detect the presence of 1.0 pi signals, or bad weave artifacts as illustrated in FIG. 1A, within the column of samples, for example, seven pixels. In addition to detecting weave artifacts, the PCC may also be utilized to determine whether and to what degree to deinterlace video fields utilizing weaving in instances where the PCC may be defined as being low, or deinterlace using spatial interpolation in instances where the PCC may be defined as being high.

Figure 1C:
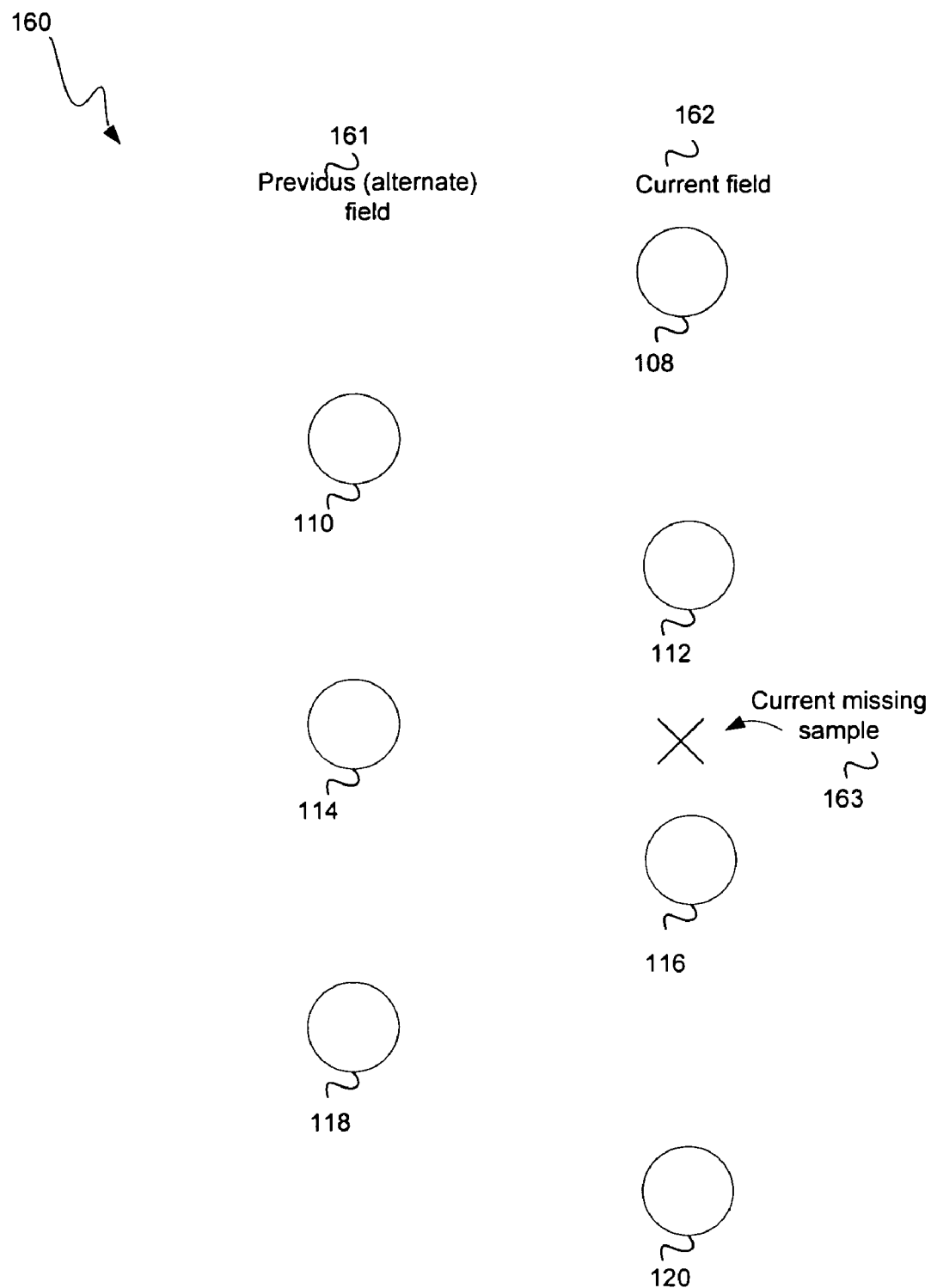
FIG. 1C is a diagram illustrating the selection of pixel samples of FIG. 1B, for example, with pixel allocations in a current and previous fields, in accordance with an embodiment of the invention.

FIG. 1C is a diagram 160 illustrating the selection of pixel samples of FIG. 1B, for example, with pixel allocations in a current and previous fields, in accordance with an embodiment of the invention. Referring to FIG. 1C, pixel samples 108, . . . , 120 may comprise pixels from two adjacent weaved fields, such as a previous or alternate field 161 and a current field 162. The alternate field 161 and the current field 162 may correspond to the previous field 105 and the current field 103, respectively, in FIG. 1B. The alternate field 161 may comprise samples 110, 114, 118. The current field 162 may comprise samples 108, 112, 116, and 120. The current field 162 may also comprise a current missing sample 163, which may correspond to a current sample 114 in the alternate field 161. In an exemplary embodiment of the invention, the current missing sample 163 may be recreated utilizing the current sample 114 from the alternate field 161, via weaving and/or spatial interpolation. For example, the degree of weaving and spatial interpolation may be determined based on a PCC calculated for the plurality of samples 108, . . . , 120.

After weaving, fields 161 and 162 may form a video frame comprising vertically adjacent pixels 108, . . . , 120 selected from different fields. For example, a current pixel sample 114 may be selected from the alternate field 161. Pixel samples 112 and 116 may be selected from the current field 162 so that pixel samples 112 and 116 may be located immediately above and below, respectively, the current missing sample 163. Pixel samples 110 and 118 may be selected from the alternate field 161 so that pixel sample 110 may be located above pixel sample 112, and pixel sample 118 may be located below pixel sample 116, when the two fields 161 and 162 are weaved. Pixel samples 108 and 120 may be selected from the current field 162 so that pixel sample 108 may be located above pixel sample 110, and pixel sample 120 may be located below pixel sample 118, when the two fields 161 and 162 are weaved.

In an exemplary aspect of the invention, a difference polarity may be calculated for each of the plurality of pairs of adjacent pixels 108-110, 110-112, 112-114, 114-116, 116-118, and 118-120 from different fields. A polarity change count (PCC) may then be calculated by counting the number of reversals of the difference polarities so calculated. In this regard, the PCC method may function as a sensitive and reasonably accurate frequency detector that may detect the presence of 1.0 pi signals within the column of samples comprising pixels 108, . . . , 120. Accordingly, PCC may then be utilized to detect weave artifacts within the video frame comprising weaved adjacent fields 161 and 162. The PCC may further be utilized to determine whether and to what extent to deinterlace video fields 161 and 162 utilizing weaving in order to recreate the current missing sample 163. For example, based on at least the calculated PCC, weaving and spatial interpolation may be blended for purposes of deinterlacing fields 161 and 162 and recreating the current missing sample 163.

Figure 2:
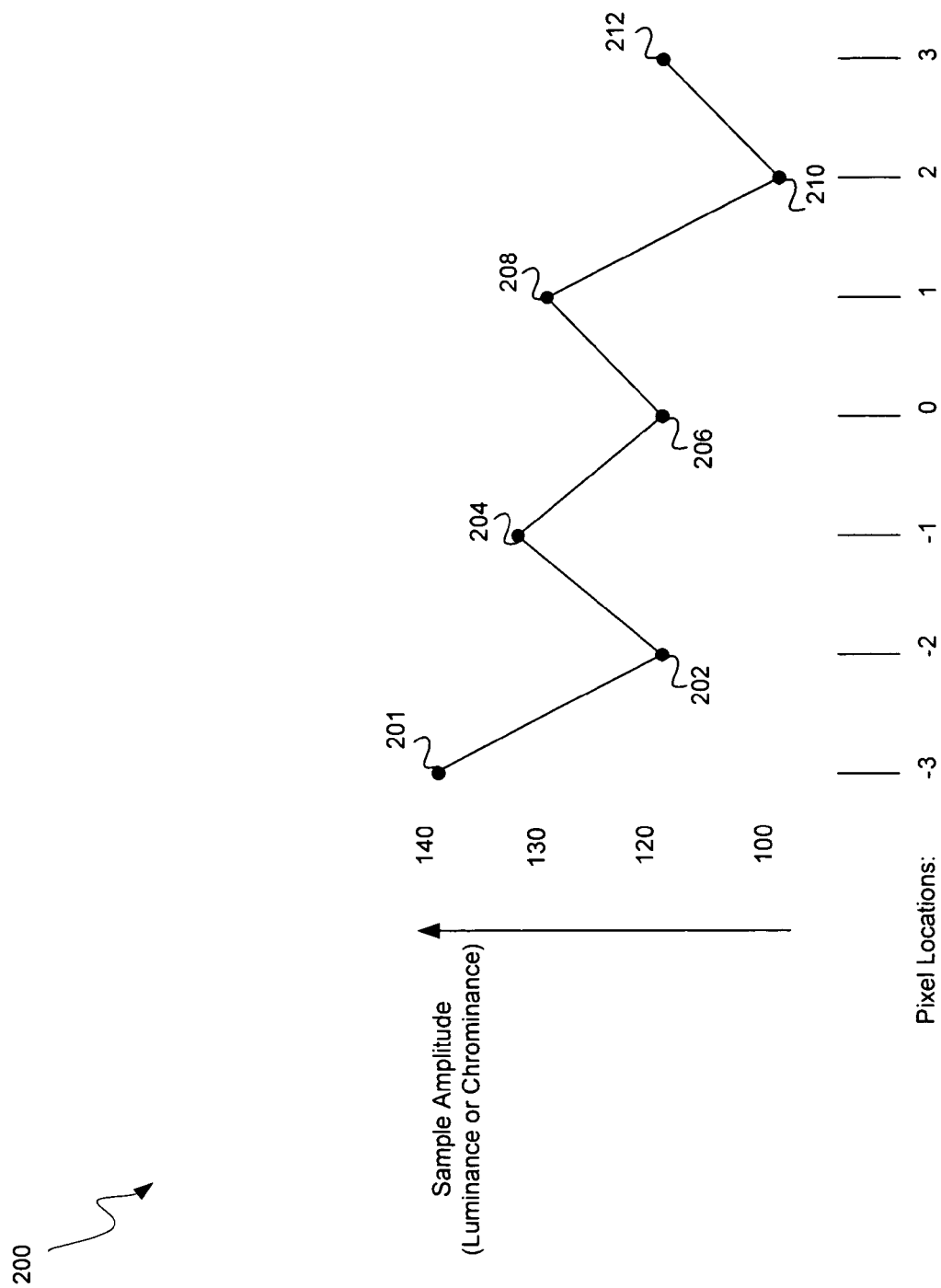
FIG. 2 is a diagram illustrating a plurality of samples for polarity change count (PCC) measurement, in accordance with an embodiment of the invention.

FIG. 2 is a diagram illustrating a plurality of samples for polarity change count (PCC) measurement, in accordance with an embodiment of the invention. Referring to FIG. 2, there is shown a graph 200 illustrating PCC measurement for a plurality of adjacent pixel samples 201, . . . , 212, which are selected from different fields. For example, pixel samples 201, 204, 208 and 212 may be selected from a current field; and pixel samples 202, 206, and 210 may be selected from a corresponding alternate video field. The sample pixel locations corresponding to pixels 201, . . . , 212 may be −3, . . . , 3 along the vertical axis of the video, with location 0 being the location of the current sample pixel 206 from the alternate field. The amplitude for the pixel samples 201, . . . , 212 may range from 100 to 140, for example, as illustrated along the vertical axis in FIG. 2. In one aspect of the invention, the pixel sample amplitude may comprise luminance, or brightness, amplitude of the sample pixels. In another aspect of the invention, the pixel sample amplitude may comprise chrominance amplitude of the sample pixels.

A polarity change count (PCC) for pixel samples 201, . . . , 212 may be calculated by counting the number of reversals in the difference polarities between successive lines within the column of pixel samples comprising the adjacent pixels 201, 212. For example, amplitude differences may be calculated for each pair of pixels (201-202), (202-204), (204-206), (206-208), (208-210), and (210-212). The amplitude differences may be calculated as differences in chrominance and/or luminance of the sample pixels 201, . . . , 212. In an exemplary aspect of the invention, if an amplitude difference is negative, a difference polarity of −1 may be assigned to the corresponding pixel pair. Similarly, if an amplitude difference is positive, a difference polarity of 1 may be assigned to the corresponding pixel pair. A polarity change count (PCC) may then be determined for pixels 201, . . . , 212 by calculating the number of changes of difference polarity found within the column of pixel samples. Therefore, the PCC result for any given column of 7 sample pixels, such as pixels 201, . . . , 212, may be one of 6 possible values: {0, 1, 2, 3, 4, 5}. In one embodiment of the invention, when counting the number of polarity changes, only consecutive polarity changes, which include the current pixel sample 206 from the alternate field, may be counted.

With regard to luminance amplitude, the general trend of the samples within the column of pixels 201, . . . , 212 is downward or darker, for example, while a distinct pattern of alternating up and down relative values may be present. In one embodiment of the invention, a polarity change count for pixel samples 201, . . . , 212 may be utilized to detect an up and/or down pattern, which may be indicative of weave artifacts. Accordingly, this may be utilized to distinguish weave artifacts from valid details. The presence of weave artifacts, for example, may be indicated by alternating difference polarities for each pixel pair for the plurality of pixels 201, . . . , 212. As a result, with regard to the 7 selected pixel samples 201, ..., 212, there may be a total of 6 difference polarities and a maximum of 5 consecutive alternations in the difference polarity values. Since there are a total of five consecutive changes in the polarity of differences for pixels 201, ..., 212, the polarity change count is 5.

In this regard, a high PCC value may be indicative of the presence of bad weave artifacts and, therefore, spatial interpolation may be selected as a major contributing method for deinterlacing interlaced video in the location where such a high PCC value is found. Similarly, a low PCC value may be indicative of a lack of bad weave artifacts and, therefore, weaving may be selected as a major contributing method for deinterlacing interlaced video in the location where such a low PCC value is found. In one embodiment of the invention, a calculated PCC for a plurality of weaved pixels may be considered as a high PCC if the calculated PCC is greater than one half the maximum possible PCC. Similarly, a calculated PCC for a plurality of weaved pixels may be considered as a low PCC if the calculated PCC is less than one half the maximum possible PCC.

In another embodiment of the invention, pixel values that result from weaving and pixel values that result from spatial interpolation may be combined in a weighted sum, the weighting being dependant at least in part on the value of the PCC at each pixel. In such circumstances, higher PCC values may result in greater weighting of the spatial interpolation values, and lower PCC values may result in greater weighting of the weaving values. The weighting performed may utilize a non-linear function applied to the PCC value, i.e. the weighting may not be linearly determined by the PCC value.

In yet another embodiment of the invention, a PCC value may indicate approximately the degree to which a weave artifact is present within the samples 201, ..., 212 from the two fields used to calculate the PCC value. In this regard, the PCC value may correspond to the likelihood that a signal at the frequency of 1.0 pi is present within the samples 201, ..., 212. Different PCC values may be interpreted as implying different liklihoods that weave artifacts are present in the samples 201, ..., 212. Such PCC values may be mapped to a range of, for example, 0 to 1, and the resulting value used to control a weighting of a weave value and a spatial interpolation value in the construction of an output value for de-interlacing. An example of such a mapping from PCC to a weighting factor may be illustrated by the following table:

| PCC | WEIGHTING VALUE |
|-----|-----------------|
| 0   | 0               |
| 1   | 0.2             |
| 2   | 0.7             |
| 3   | 0.9             |
| 4   | 1               |
| 5   | 1               |

In this regard, a weighted sum may be calculated utilizing the following equation:

weighed_sum=weighting_value*spatial_interpolation_value+ (1−weighting_value)*weave_value.

For example, using the set of mapping values given above, a PCC value of 2 may result in a weighted sum comprising 0.7*spatial_interpolation_value+0.2*weave value. The two different fields may then be de-interlaced utilizing both weaving and spatial interpolation, based on the weighted sum calculated using the PCC.

Figure 3:
FIG. 3 is a diagram illustrating a plurality of diagonally adjacent samples for polarity change count (PCC) measurement, in accordance with an embodiment of the invention.
Figure 3:
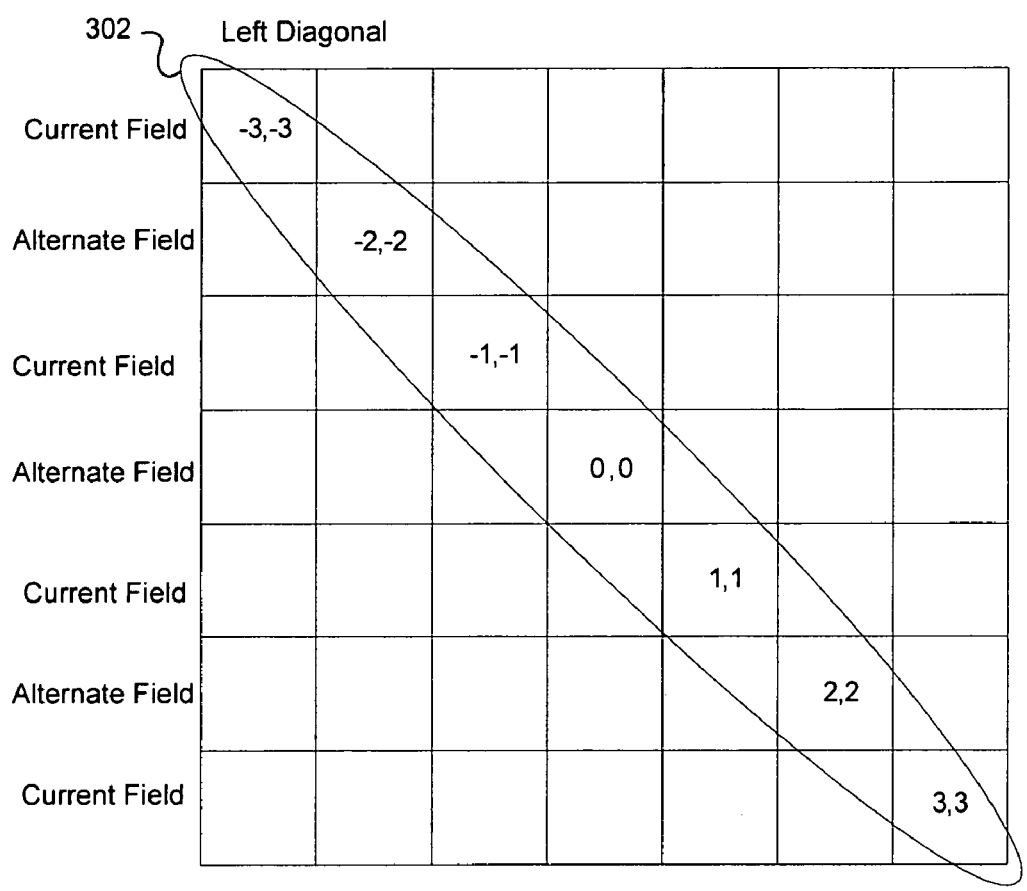

FIG. 3 is a diagram illustrating a plurality of diagonally adjacent samples for polarity change count (PCC) measurement, in accordance with an embodiment of the invention. Referring to FIG. 3, there is illustrated a video frame comprising weaved alternate and current video fields. A left diagonal set of pixel samples 302 may be utilized as the column inputs to the PCC algorithm, in order to calculate PCC and detect weave artifacts at diagonal edges. The left diagonal pixel sample set 302 may comprise a current pixel (0,0) and diagonally adjacent pixels (−3,−3), (−2,−2), (−1,−1), (1,1), (2,2), and (3,3).

In one aspect of the invention, the left diagonal pixel sample set 302 may be at 45 degrees in relation to a horizontal video line. In an exemplary aspect of the invention, deinterlacing may be performed utilizing a weighted sum based, at least in part, on the calculated PCC. For example, higher PCC values for the set of samples 302 may result in greater weighting of spatial interpolation for de-interlacing, and lower PCC values for the set of samples 302 may result in greater weighting of weaving during de-interlacing. In this regard a weighted sum of weaving and spatial interpolation may be utilized for de-interlacing the current and alternate field comprising the set of samples 302.

In one embodiment of the invention, a calculated PCC for a plurality of weaved pixels may be considered as a high PCC if the calculated PCC is greater than one half the maximum possible PCC. Similarly, a calculated PCC for a plurality of weaved pixels may be considered as a low PCC if the calculated PCC is less than one half the maximum possible PCC. The present invention may not be limited in the way a high and low PCC may be calculated. Therefore, other methods of calculating high and low PCC may also be utilized. Furthermore, PCC may be utilized for determining a weighted sum for de-interlacing, as described above.

Figure 4:
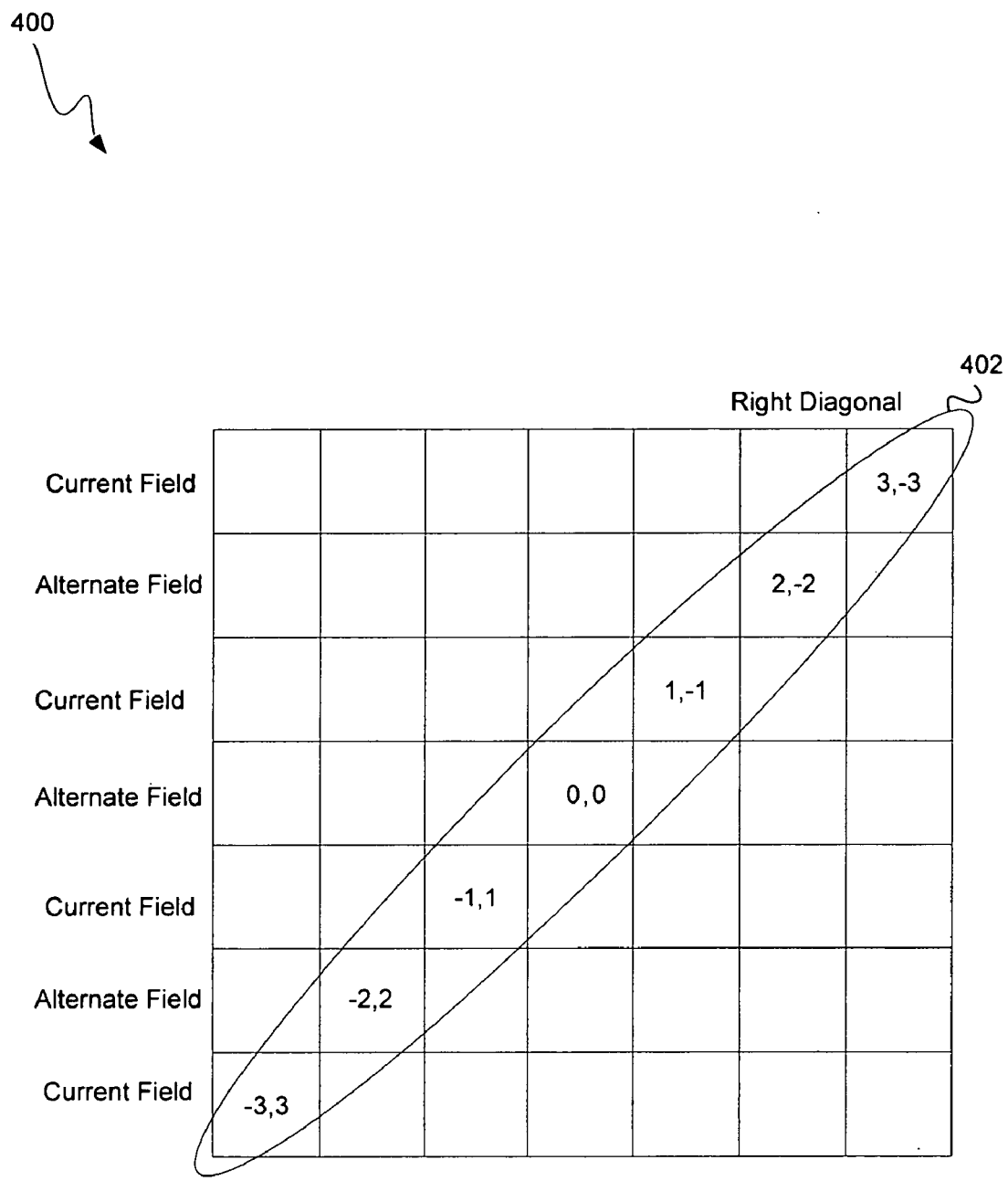
FIG. 4 is a diagram illustrating a plurality of diagonally adjacent samples for polarity change count (PCC) measurement, in accordance with an embodiment of the invention.

FIG. 4 is a diagram illustrating a plurality of diagonally adjacent samples for polarity change count (PCC) measurement, in accordance with an embodiment of the invention. Referring to FIG. 4, there is illustrated a video frame comprising weaved alternate and current video fields. A right diagonal set of pixel samples 402 may be utilized as the column inputs to the PCC algorithm, in order to calculate PCC and detect weave artifacts at diagonal edges. The right diagonal pixel sample set 402 may comprise a current pixel (0,0) and diagonally adjacent pixels (3,−3), (2,−2), (1,−1), (−1,1), (−2,2), and (−3, 3). In one aspect of the invention, the right diagonal pixel sample set 402 may be at 45 degrees in relation to a horizontal video line.

Figure 5:
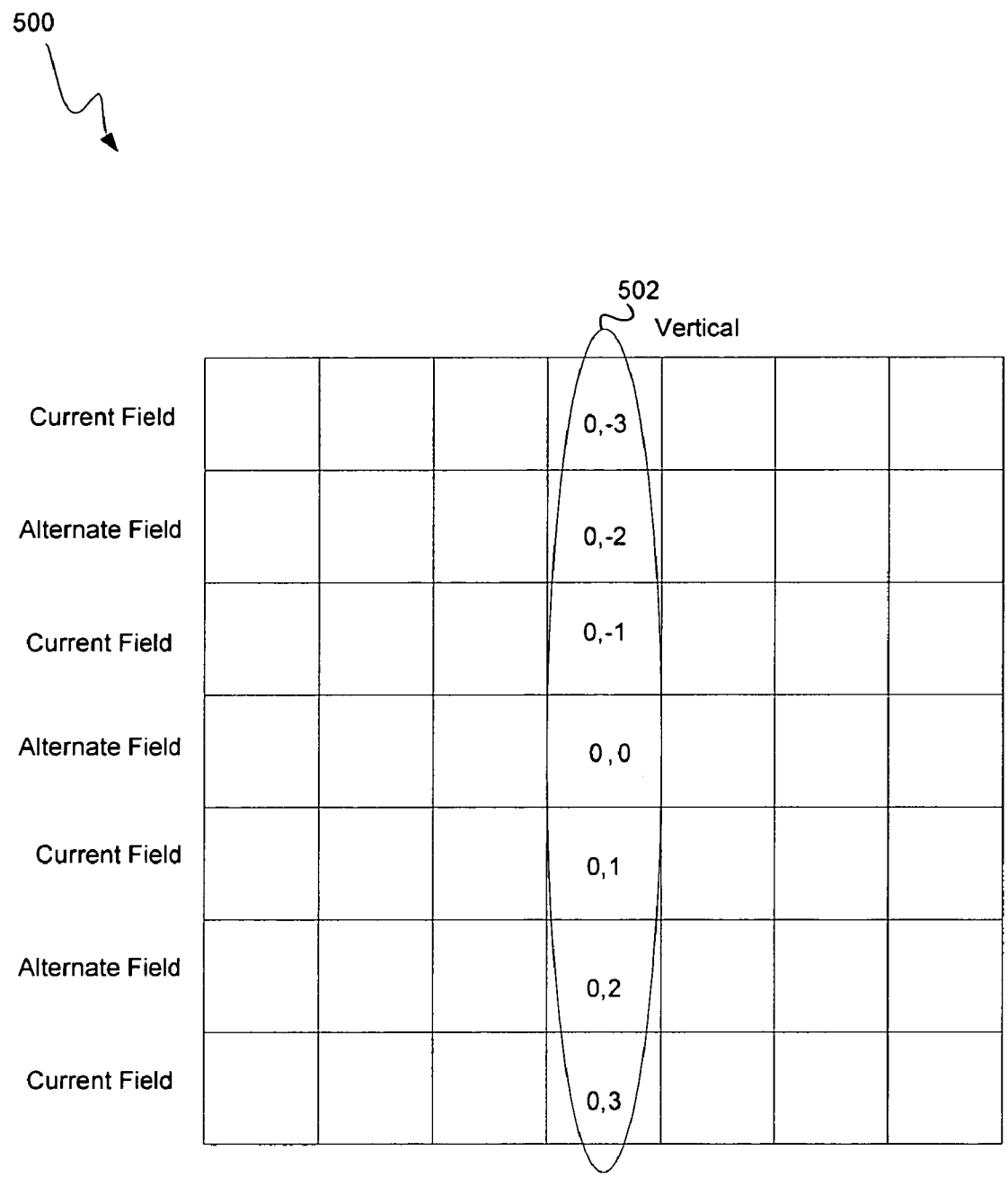
FIG. 5 is a diagram illustrating a plurality of vertically adjacent samples for polarity change count (PCC) measurement, in accordance with an embodiment of the invention.

In an exemplary aspect of the invention, deinterlacing may be performed utilizing a weighted sum based, at least in part, on the calculated PCC. For example, higher PCC values for the set of samples 402 may result in greater weighting of spatial interpolation for de-interlacing and lower PCC values for the set of samples 402 may result in greater weighting of weaving during de-interlacing. In this regard a weighted sum of weaving and spatial interpolation may be utilized for de-interlacing the current and alternate field comprising the set of samples 402. FIG. 5 is a diagram illustrating a plurality of vertically adjacent samples for polarity change count (PCC) measurement, in accordance with an embodiment of the invention. Referring to FIG. 5, there is illustrated a video frame comprising weaved alternate and current video fields. A vertical set of pixel samples 502 may be utilized as the column inputs to the PCC algorithm, in order to calculate PCC and detect weave artifacts at diagonal edges. The vertical pixel sample set 502 may comprise a current pixel (0,0) and vertically adjacent pixels (0,−3), (0,−2), (0,−1), (0,1), (0,2), and (0, 3).

In an exemplary aspect of the invention, deinterlacing may be performed utilizing a weighted sum based, at least in part, on the calculated PCC. For example, higher PCC values for the vertical set of samples 502 may result in greater weighting of spatial interpolation for de-interlacing. Similarly, lower PCC values for the vertical set of samples 502 may result in greater weighting of weaving during de-interlacing. In this regard a weighted sum of weaving and spatial interpolation may be utilized for de-interlacing the current and alternate field comprising the set of samples 502.

In an alternate embodiment of the invention, the choice of which set of samples to use to create a PCC value utilized for associated functions, such as de-interlacing, may be based, for example, on determining which of a plurality of sets of vertically adjacent samples produce the largest PCC value. Alternatively, this choice may be based on the finding of an edge in the video content and determining which angle of sample sets best matches the angle of the edge so found.

Figure 6:
FIG. 6 is a diagram illustrating a plurality of diagonally and vertically adjacent samples for polarity change count (PCC) measurement, in accordance with an embodiment of the invention.

FIG. 6 is a diagram illustrating a plurality of diagonally and vertically adjacent samples for polarity change count (PCC) measurement, in accordance with an embodiment of the invention. Referring to FIG. 6, there is illustrated a video frame comprising weaved alternate and current video fields. A vertical and diagonal set of pixel samples 602 may be utilized as the column inputs to the PCC algorithm, in order to calculate PCC and detect weave artifacts at diagonal edges. The vertical and diagonal pixel sample set 602 may comprise a current pixel (0,0) and adjacent pixels (−2,−3), (−1,−2), (−1,−1), (1,1), (1,2), and (2,3).

In an exemplary aspect of the invention, deinterlacing may be performed utilizing a weighted sum, based, at least in part, on the calculated PCC. For example, higher PCC values for the set of samples 602 may result in greater weighting of spatial interpolation for de-interlacing. Similarly, lower PCC values for the set of samples 602 may result in greater weighting of weaving during de-interlacing. In this regard a weighted sum of weaving and spatial interpolation may be utilized for de-interlacing the current and alternate field comprising the set of samples 602.

Figure 7A:
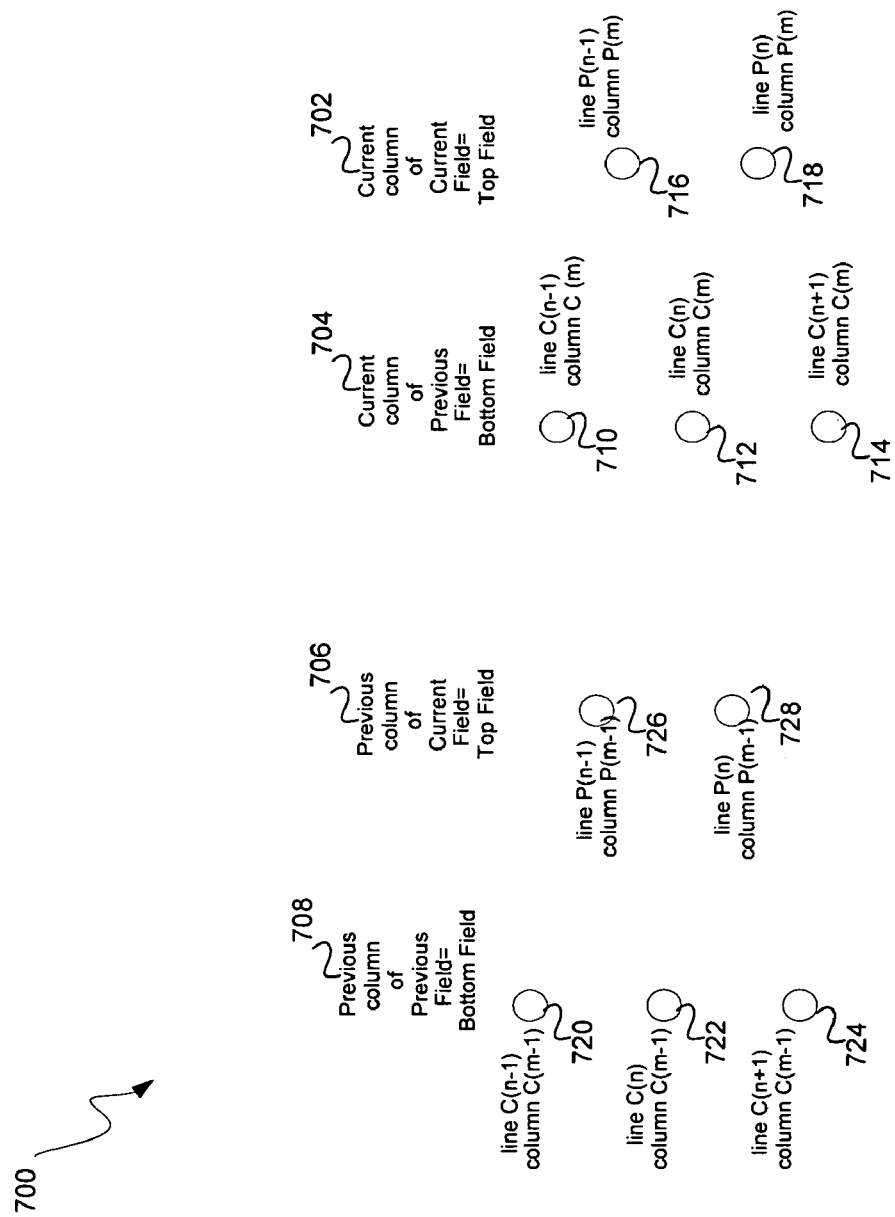
FIG. 7A is a diagram 700 illustrating pixel line numbering during exemplary calculation of a polarity change count when current field is a top field, in accordance with an embodiment of the invention.

FIG. 7A is a diagram 700 illustrating pixel line numbering during exemplary calculation of a polarity change count when the current field is a top field, in accordance with an embodiment of the invention. Referring to FIG. 7A, a polarity change count may be calculated for two horizontally adjacent columns of pixel samples from two weaved adjacent fields, a current field and a previous field. In one aspect of the invention, the current field may comprise a top field and the previous field may comprise a bottom field. The first column of pixel samples may comprise two samples 716 and 718 from a current column 702 of the current field and three samples 710, ..., 714 from a current column 704 of the previous field. The second column of pixel samples may comprise two samples 726, 728 from a previous column 706 of the current field and three samples 720, ..., 724 from a previous column 708 of the previous field.

In an exemplary aspect of the invention, a difference polarity may be calculated for each of the adjacent pairs of pixels 710-716, 716-712, 712-718, and 718-714 from the current and previous fields in the first column of pixels. A first polarity change count (PCC) may then be calculated for the first column of pixel samples by counting the number of reversals of the difference polarities between successive lines within the first column of pixel samples comprising adjacent pixels 710, ..., 718. Similarly, a difference polarity may be calculated for each of the adjacent pairs of pixels 720-726, 726-722, 722-728, and 728-724 from the current and previous fields in the second column of pixels. A second polarity change count (PCC) may then be calculated for the second column of pixel samples by counting the number of reversals of the difference polarities between successive lines within the second column of pixel samples comprising adjacent pixels 720, ..., 728. Accordingly, a total PCC may then be calculated utilizing the first and second PCC. For example, the total PCC may be calculated as an average of the first and second PCC.

In another embodiment of the invention, the total PCC value may correspond to the number of consecutive difference polarity alternations counting only the difference polarities that are the same for horizontally adjacent samples in both columns. The total PCC may be utilized to detect weave artifacts within the video frame comprising weaved current and previous fields. The total PCC may also be utilized to determine whether to deinterlace the current and previous video fields utilizing weaving, if the PCC is low, or spatial interpolation, if the PCC is high, or for controlling at least in part a combination of weaving and spatial interpolation.

Figure 7B:
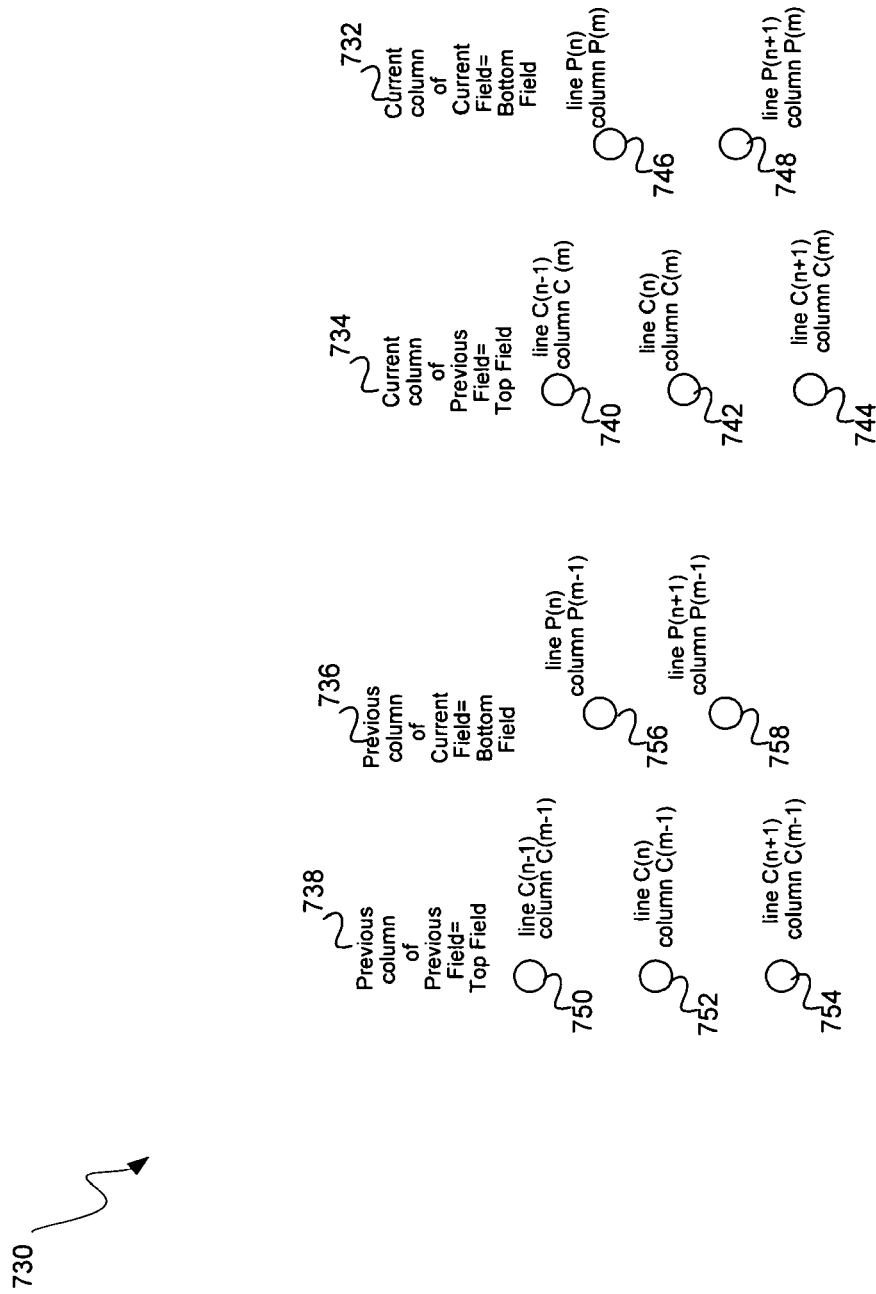
FIG. 7B is a diagram illustrating pixel line numbering during exemplary calculation of polarity change count when a current field is a bottom field, in accordance with an embodiment of the invention.

FIG. 7B is a diagram 730 illustrating pixel line numbering during exemplary calculation of polarity change count when a current field is a bottom field, in accordance with an embodiment of the invention. Referring to FIG. 7B, a polarity change count may be calculated for two horizontally adjacent columns of pixel samples from two weaved adjacent fields, a current field and a previous field. In one aspect of the invention, the current field may comprise a bottom field and the previous field may comprise a top field. The first column of pixel samples may comprise two samples 746, 748 from a current column 732 of the current field and three samples 740, ..., 744 from a current column 734 of the previous field. The second column of pixel samples may comprise two samples 756, 758 from a previous column 736 of the current field and three samples 750, ..., 754 from a previous column 738 of the previous field.

In an exemplary aspect of the invention, a difference polarity may be calculated for adjacent pairs of pixels 740-746, 746-742, 742-748, and 748-744 from the current and previous fields in the first column of pixels. A first polarity change count (PCC) may then be calculated for the first column of pixel samples by counting the number of reversals of the difference polarities between successive lines within the first column of pixel samples comprising adjacent pixels 740, ..., 748. Similarly, a difference polarity may be calculated for adjacent pairs of pixels 750-756, 756-752, 752-758, and 758-754 from the current and previous fields in the second column of pixels. A second polarity change count (PCC) may then be calculated for the second column of pixel samples by counting the number of reversals of the difference polarities between successive lines within the second column of pixel samples comprising adjacent pixels 750, ..., 758. Accordingly, a total PCC may then be calculated utilizing the first and second PCC. For example, the total PCC may be calculated as an average of the first and second PCC.

In another embodiment of the invention, the total PCC value may correspond to the number of consecutive difference polarity alternations counting only the difference polarities that are the same for horizontally adjacent samples in both columns. The total PCC may be utilized to detect weave artifacts within the video frame comprising weaved current and previous fields. The total PCC may also be utilized to determine whether to deinterlace the current and previous video fields utilizing weaving, if the PCC is low, or spatial interpolation, if the PCC is high, or for controlling at least in part a combination of weaving and spatial interpolation.

The total PCC may be utilized to detect weave artifacts within the video frame comprising weaved current and previous fields. Higher PCC values for a set of samples may result in greater weighting of spatial interpolation for de-interlacing. Similarly, lower PCC values may result in greater weighting of weaving during de-interlacing. In this regard a weighted sum of weaving and spatial interpolation may be utilized for de-interlacing the current and alternate field. For purposes of calculating the weighted sum of weaving and spatial interpolation, a calculated PCC for a plurality of weaved pixels may be considered as a high PCC if the calculated PCC is greater than one half the maximum possible PCC. Similarly, a calculated PCC for a plurality of weaved pixels may be considered as a low PCC if the calculated PCC is less than one half the maximum possible PCC. The present invention may not be limited in the way a high and low PCC may be calculated. Therefore, other methods of calculating high and low PCC may also be utilized during determination of a weighted sum of weaving and spatial interpolation for de-interlacing.

For example, for a plurality of 9 pixel samples from adjacent fields, the maximum PCC may be 7. A calculated PCC may be considered high, and spatial interpolation may be applied, if PCC equals 5, 6 or 7. Similarly, a calculated PCC may be considered low, and weaving may be applied, if PCC equals 1, 2, or 3.

Figure 8:
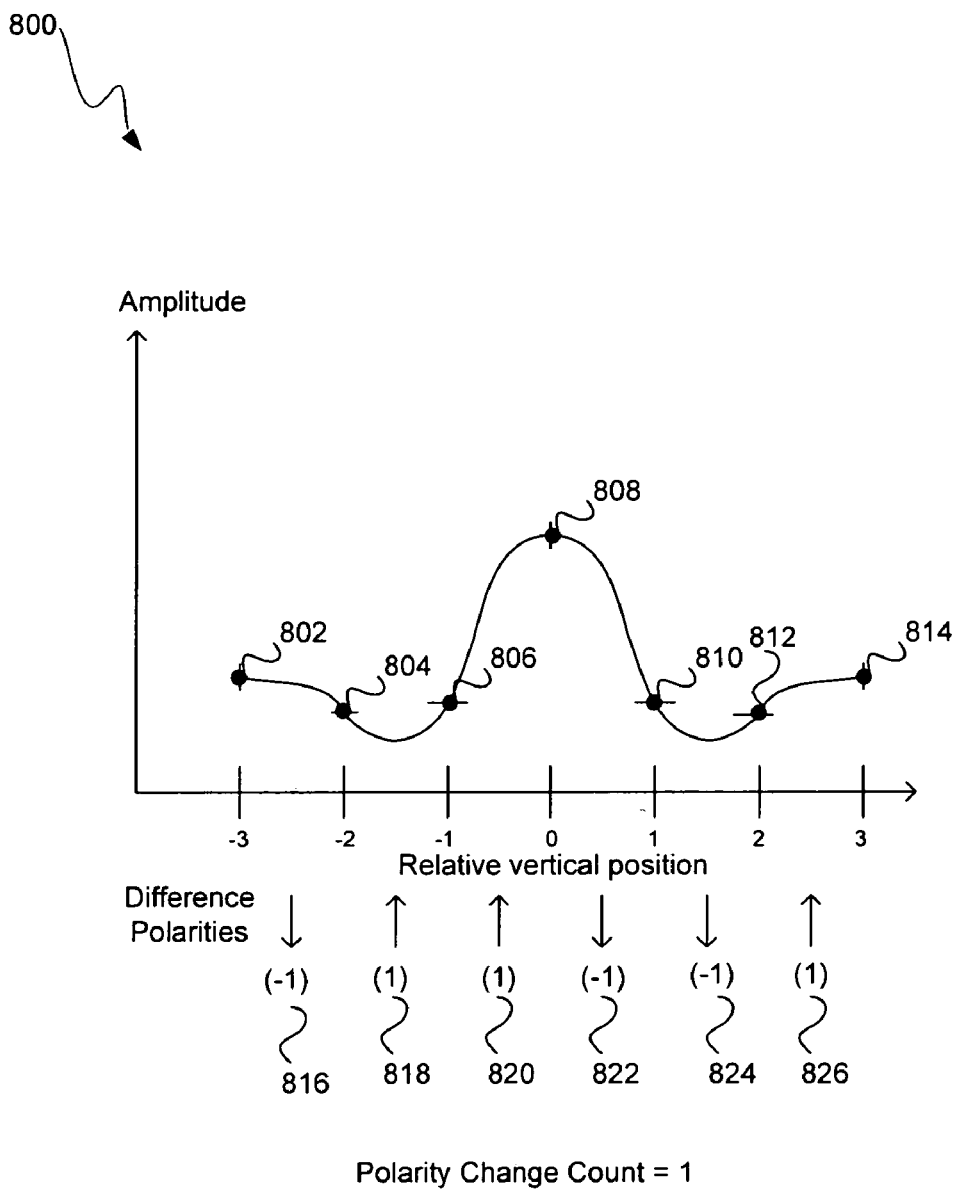
FIG. 8 is a graph illustrating polarity change count calculation for a valid vertical detail, in accordance with an embodiment of the invention.

FIG. 8 is a graph 800 illustrating polarity change count calculation for a valid vertical detail, in accordance with an embodiment of the invention. Referring to FIG. 8, a PCC may be calculated for a plurality of adjacent pixel samples 802, ..., 814. The sample pixel vertical locations corresponding to pixels 802, ..., 814 may be −3, ..., 3, with location 0 being the location of the current sample pixel 808. A polarity change count (PCC) for pixel samples 802, ..., 814 may be calculated by counting the number of reversals in the difference polarities between successive lines within the column of pixel samples comprising the adjacent pixels 802, ..., 814. For example, signed amplitude differences may be calculated for each pair of pixels (802-804), (804-806), (806-808), (808-810), (810-812), and (812-814). The amplitude differences may be calculated as differences in chrominance and/or luminance of the sample pixels 802, ..., 814. In an exemplary aspect of the invention, if an amplitude difference is negative, a difference polarity of −1 may be assigned to the corresponding pixel pair. Similarly, if an amplitude difference is positive, a difference polarity of 1 may be assigned to the corresponding pixel pair. Consequently, the difference polarities for pixel pairs (802-804), (804-806), (806-808), (808-810), (810-812), and (812-814) may be designated as 816, ..., 826, respectively.

Referring to FIG. 8, difference polarities 816, ..., 826 may be calculated as −1, 1, 1, −1, −1, and 1, respectively. A polarity change count may then be determined for pixels 802, ..., 814 by calculating the number of consecutive difference polarity changes for each pair of pixels selected from pixels 802, ..., 814. Therefore, the PCC result for pixels 802, ..., 814 is 1 since there is only one consecutive polarity change, from the difference between pixels 806 and 808 and the difference between pixel 808 and pixel 810. In this regard, since the PCC for pixels 802, ..., 814 is 1, the low PCC may be indicative of absence of bad weave artifacts and presence of valid video detail represented by pixels 802, ..., 814. Consequently, weaving may be selected as a method for deinterlacing interlaced video frames comprising pixels 802, ..., 814.

A coring value may be used in conjunction with the difference polarity calculation, such that if the absolute value of the difference between two pixels in a pair is less than the coring value, the difference polarity may be considered to be indeterminate. Such an indeterminate difference polarity may be not used when calculating the PCC value. In such circumstances, in the example of FIG. 8, small differences such as between pixels 802 and 804, between 804 and 806, between 810 and 812, or between 812 and 814, may not exceed the coring value and hence may be considered to be indeterminate. In this regard, a modified example may be considered. If the value of pixel 806 were less than the value of pixel 804, the difference polarity between pixels 804 and 806 might be negative, rather than positive, as shown in FIG. 8, which may result in a larger PCC value. If in this modified example the absolute value of the difference between pixels 804 and 806 were less than the coring value, the difference polarity may be considered indeterminate and the PCC value would not be increased.

Figure 9:
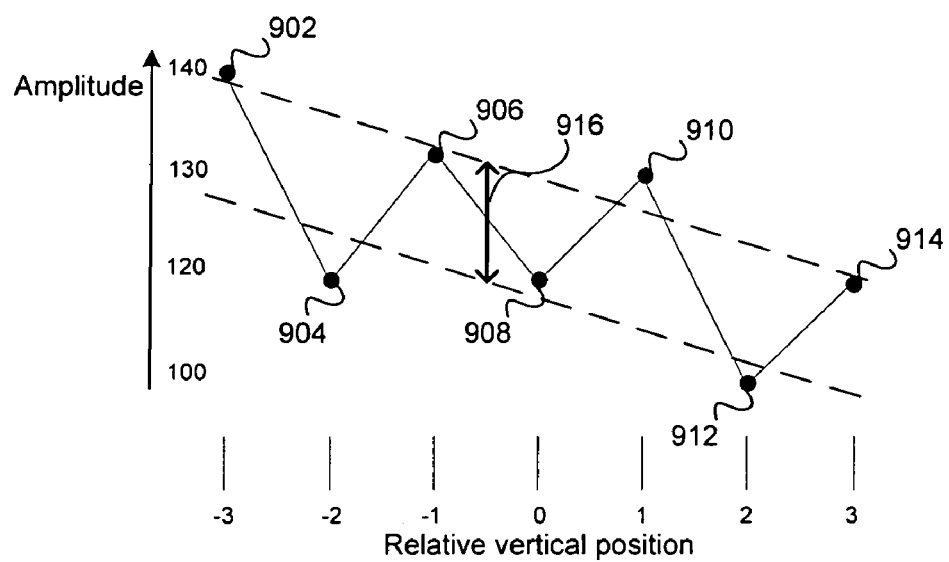
FIG. 9 is graph 900 illustrating the average amplitude of differences, which may be used as part of the control of a de-interlacing function, for example, in accordance with an embodiment of the invention.

FIG. 9 is graph 900 illustrating the average amplitude of differences, which may be used as part of the control of a de-interlacing function, for example, in accordance with an embodiment of the invention. Referring to FIG. 9, the plurality of adjacent pixel samples 902, ..., 914 may be selected from different adjacent fields. For example, samples 902, 906, 910 and 914 may be selected from a current field, and samples 904, 908, and 912 may be selected from a corresponding alternate video field. The sample vertical locations corresponding to samples 902, ..., 914 may be −3, ..., 3, with location 0 being the location of the current sample 908 from the alternate field. The amplitude for the samples 902, ..., 914 may range from 100 to 140, for example, as illustrated along the vertical axis in FIG. 9. In one aspect of the invention, the sample amplitude may comprise luminance, or brightness, amplitude of the sample samples. In another aspect of the invention, the sample amplitude may comprise chrominance amplitude of the samples.

A polarity change count (PCC) for samples 902, ..., 914 may be calculated by counting the number of reversals in the difference polarities between successive lines within the column of pixel samples comprising the adjacent pixels 902, ..., 914. A polarity change count may then be determined for pixels 902, ..., 914 by calculating the number of subsequent difference polarity changes for each pair of pixels selected from pixels 902, ..., 914. Deinterlacing may be performed utilizing a weighted sum, based, at least in part, on the calculated PCC. For example, higher PCC values for the set of samples 902, ..., 914 may result in greater weighting of spatial interpolation for de-interlacing. Similarly, lower PCC values for the set of samples 902, 914 may result in greater weighting of weaving during de-interlacing. In this regard a weighted sum of weaving and spatial interpolation may be utilized for de-interlacing the current and alternate field comprising the set of samples 902, ..., 914. Furthermore, the average amplitude difference of the pixels 902, ..., 914 utilized for calculating the PCC may be combined with the PCC value to produce a signal or variable that controls, at least in part, a weighting function in a weighted sum of values from spatial interpolation and weaving. For example, a larger amplitude difference may result in more weighting of the spatial interpolation values, while a smaller amplitude difference may result in more weighting of the weaving values.

In one embodiment of the invention, a difference polarity measurement may be inherently sensitive to noise, such that a high PCC for pixels 902, ..., 914 may result even when the content does not have any component at 1.0 pi. In this regard, the PCC calculation method may incorporate a coring function to eliminate the effects of small noise values on the PCC results. For example, the average amplitude of differences 916 for pixels 902, ..., 914 may be utilized to adjust the coring value. For example, the coring value may be set to a fraction of the average amplitude difference, for example, ¼ of the average amplitude difference. Also, if the average amplitude is calculated on the pixel values used to produce the PCC, then those pixels may be selected before the averages are calculated, which may prevent using the average to control the coring. The average may be also used to control the weighted average of spatial interpolation versus weaving used in de-interlacing.

In an exemplary aspect of the invention, difference polarities for pairs of pixels selected from pixels 902, . . . , 914 may be included in the PCC calculation, if the differences between the values of the pixels in the pairs of pixels are greater than the coring value 916. In this regard, a PCC of 5 for pixels 902, . . . , 914 may be a strong indicator of the presence of a 1.0 pi signal exceeding the coring value. The PCC of 0 or 1 may indicate no significant 1.0 pi signal. A PCC of 2 may indicate that some 1.0 pi signal may be present. In this regard, PCC of 0 or 1 may be considered a low PCC and weaving may be applied for deinterlacing. Similarly, a PCC of 3, 4, or 5 may be considered a high PCC and spatial interpolation may be applied for deinterlacing. Alternatively, a PCC may be used to control, at least in part, a weighted sum of values from weaving and spatial interpolation.

The coring value 916 may be set to 4, for example, for both luma and chroma, which may be significantly greater than a sigma or standard deviation for random noise with signal to noise ratio (SNR) values that are typical of analog video. It should be recognized that one or more columns of pixel samples as well as other coring values may be utilized for PCC calculations. For example, two adjacent columns of samples may be utilized to calculate the PCC. The PCC may be equal to 5 when both a current column and a column to its immediate left, both have PCC equal to 5 with the difference polarities having the same pattern in both columns.

In another embodiment of the invention, an average difference value may be calculated, representing the difference in amplitude between the samples in the column of samples from the current field and the samples in the column of samples from an alternate field. Referring again to FIG. 9, for example, an average difference value may be calculated as the average of the values of samples 902, 906, 910 and 914 minus the average of the values of samples 904, 908 and 912. A resulting average difference value may be combined with a PCC value to form a modified weighting value which may be used to control a weighting of a weave value and a spatial interpolation value. A small average difference may indicate that a weave artifact may be less visible, and a large average difference may indicate that a weave artifact may be more visible. An example of a combination of a weighting value, based on a PCC value, with an average difference value to create a modified weighting value may be illustrated by the following equation:

modified_weighting_value=min(1,
(weighting_value*max(0, (abs(average_difference)-$K\_1$))*$K\_2$) ), where "min" may be a minimum function, "max" may be a maximum function, and "abs" may be an absolute value function.

Alternatively, various linear or non-linear functions may be used to combine a weighting value with an average difference value. The value of weighting value may be derived from a PCC value using the mapping described above in reference to FIG. 2. Alternatively, a different mapping may be utilized. Example values of $K\_1$, and $K\_2$ may be: $K\_1$=3 and $K\_2$=0.33. Alternatively, different values may be chosen in another embodiment of the invention.

Figure 10:
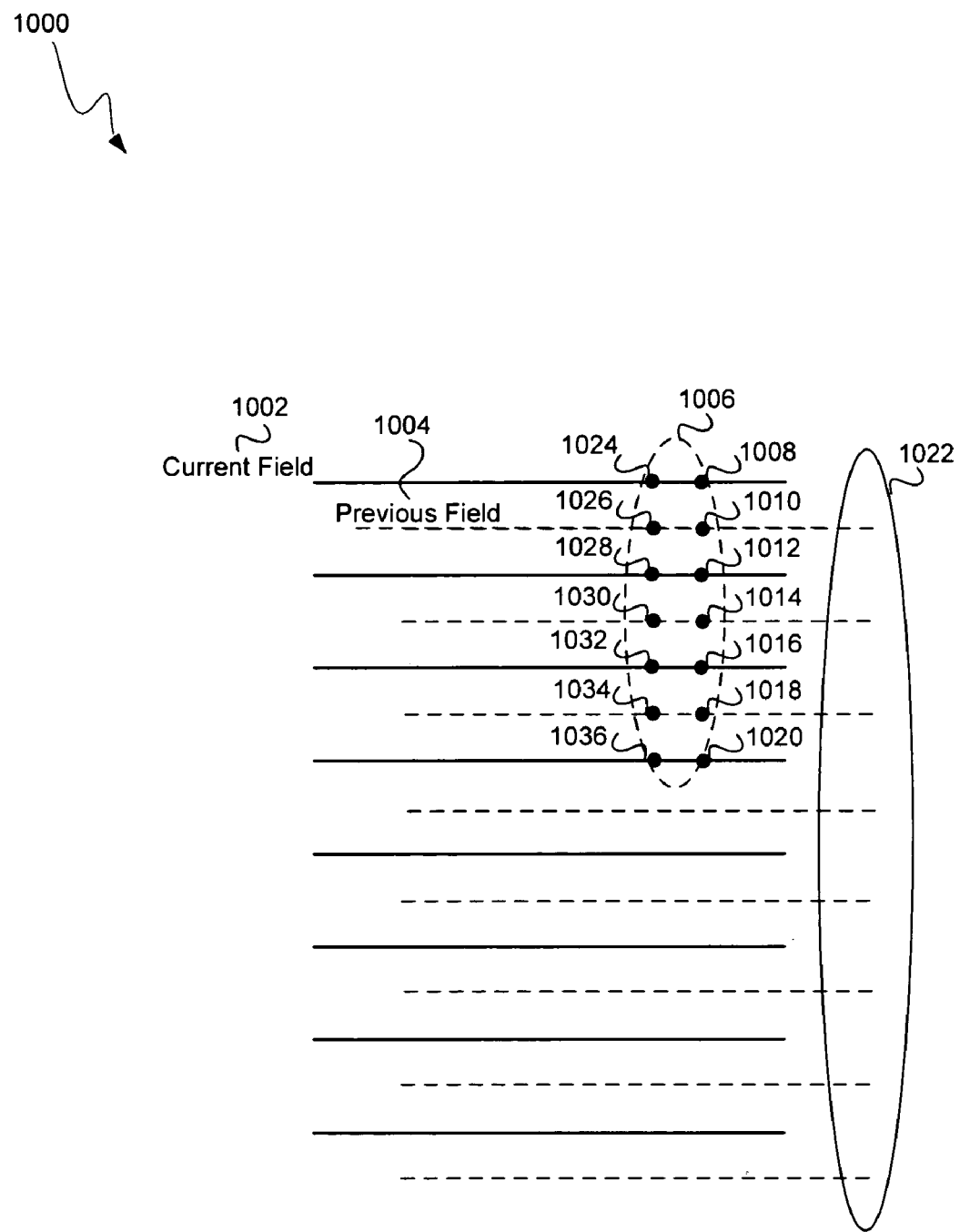
FIG. 10 is a diagram illustrating a selection of pixel samples in horizontally adjacent columns from different fields, in accordance with an embodiment of the invention.

FIG. 10 is a diagram 1000 illustrating a selection of pixel samples in horizontally adjacent columns from different fields, in accordance with an embodiment of the invention. Referring to FIG. 10, there is illustrated a plurality of adjacent video lines from different video fields, such as, for example, a current field 1002 and a previous field 1004. The current field 1002 and the previous field 1004 may be weaved together resulting in weave artifacts, such as artifacts 1022. The weave artifacts 1022 may result from horizontal motion of vertical or near vertical edges of a video field. A set of pixels 1006 may be selected from adjacent video lines for comparison and calculation of a polarity change count, for example. For example, the pixel set 1006 may comprise pixel samples in two horizontally adjacent vertical columns.

The first vertical column may comprise pixels 1008, . . . , 1020, and the second horizontally adjacent vertical column may comprise pixels 1024, . . . , 1036. Video lines in the current field 1002 and the previous field 1004 may then be deinterlaced utilizing weaving, spatial interpolation or a combination of weaving and spatial interpolation, based, at least in part, on the calculated polarity change count (PCC) for the pixel set 1006. In one embodiment of the invention, a polarity change count may be calculated for each of the two horizontally adjacent vertical columns of pixel samples. A total polarity change count may then be calculated for the entire set of pixels 1006 utilizing the two calculated polarity change values. For example, a total polarity change count may be calculated as an average of the polarity change values for pixels 1024, . . . , 1036 and pixels 1008, . . . , 1020.

Figure 11:
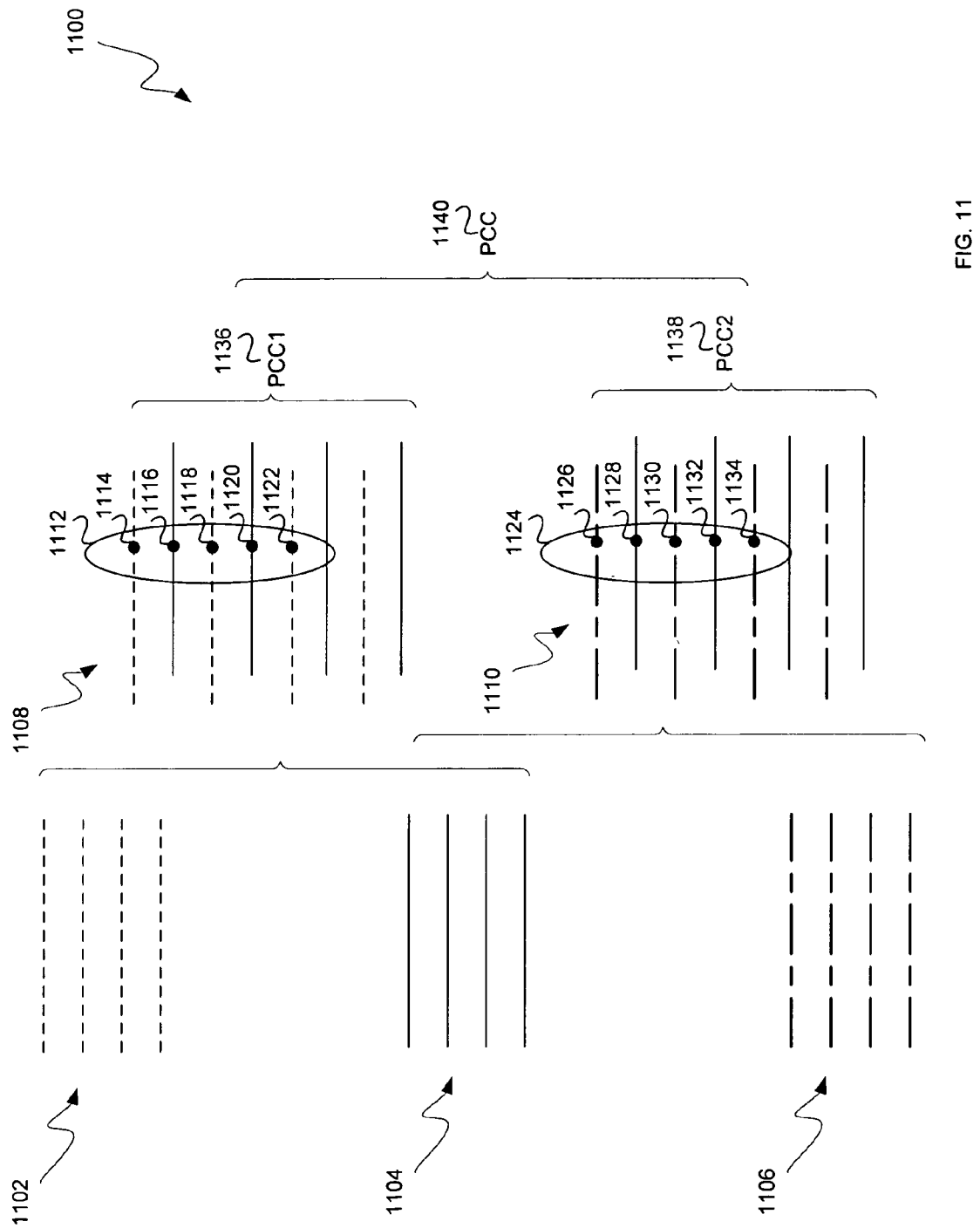
FIG. 11 is a diagram illustrating weaving of a current field with two adjacent fields and calculation of average polarity change count, in accordance with an embodiment of the invention.

FIG. 11 is a diagram 1100 illustrating weaving of a current field with two adjacent fields and calculation of a combined polarity change count, in accordance with an embodiment of the invention. Referring to FIG. 11, a polarity change count may be calculated utilizing a current field 1104 and two adjacent fields 1102 and 1106. In one aspect of the invention, the current field 1104 may be a top field and fields 1102 and 1106 may be adjacent bottom fields. In another embodiment of the invention, the current field 1104 may be a bottom field and fields 1102 and 1106 may be adjacent top fields. The calculated polarity change count for video fields 1102, 1104, and 1106 may be utilized to determine whether the video fields 1102, 1104, and 1106 may be deinterlaced utilizing weaving or spatial interpolation. For example, the current field 1104 may be weaved with the adjacent field 1102 to generate frame 1108. Similarly, the current field 1104 may be weaved with the adjacent field 1106 to generate frame 1110.

In one embodiment of the invention, a first polarity change count (PCC) 1136 may be calculated for sample pixels in the frame 1108 and a second polarity change count 1138 may be calculated for sample pixels in the frame 1110. During calculation of the first polarity change count 1136, a plurality of pixels 1114, . . . , 1122 may be selected from adjacent video lines from the weaved fields 1102 and 1104 for calculation of the first PCC 1136. Similarly, during calculation of the second polarity change count 1138, a plurality of pixels 1126, . . . , 1134 may be selected from adjacent video lines from the weaved fields 1104 and 1106 for calculation of the second PCC 1138. The pixels 1114, 1118 and 1122 from the current field 1104 comprised by the plurality of pixels 1114, . . . , 1122 used to calculate the first PCC 1136 may be the same as the pixels 1126, 1139 and 1134 from the current field 1104 comprised by the plurality of pixels 1126, . . . , 1134 used to calculate the second PCC 1138.

A final polarity change count 1140 may be calculated utilizing the first polarity change count 1136 and the second polarity change count 1138. For example, the final polarity change count 1140 may be calculated as an average of the first polarity change count 1136 and the second polarity change count 1138. The final polarity change count 1140 may be utilized during deinterlacing of the adjacent fields 1102, 1104, and 1106. The final PCC 1140 may be utilized to detect weave artifacts within the video frame comprising weaved adjacent fields 1102 and 1104, and 1104 and 1106 to determine whether to deinterlace video fields 1102, 1104, and 1106 utilizing weaving, if the PCC 1140 is low, or spatial interpolation, if the PCC 1140 is high.

In another embodiment of the invention, the final polarity change count 1140 may be calculated as the lower of the first PCC 1136 and the second PCC 1138. The alternate field associated with the lower PCC value may be used for the weaving operations, if any, used in de-interlacing the current field 1104 with the alternate fields 1102 and 1106. This selection of PCC value and this selection of alternate field may be made independently for every pixel for which de-interlacing is to be performed in the current field 1104.

Selecting one or more fields for de-interlacing using multi-valued weighted summing of weaving and spatial interpolation values is described in U.S. Patent Application Ser. No. 60/687,674 filed Jun. 6, 2005, which is incorporated herein by reference in its entirety.

Figure 12:
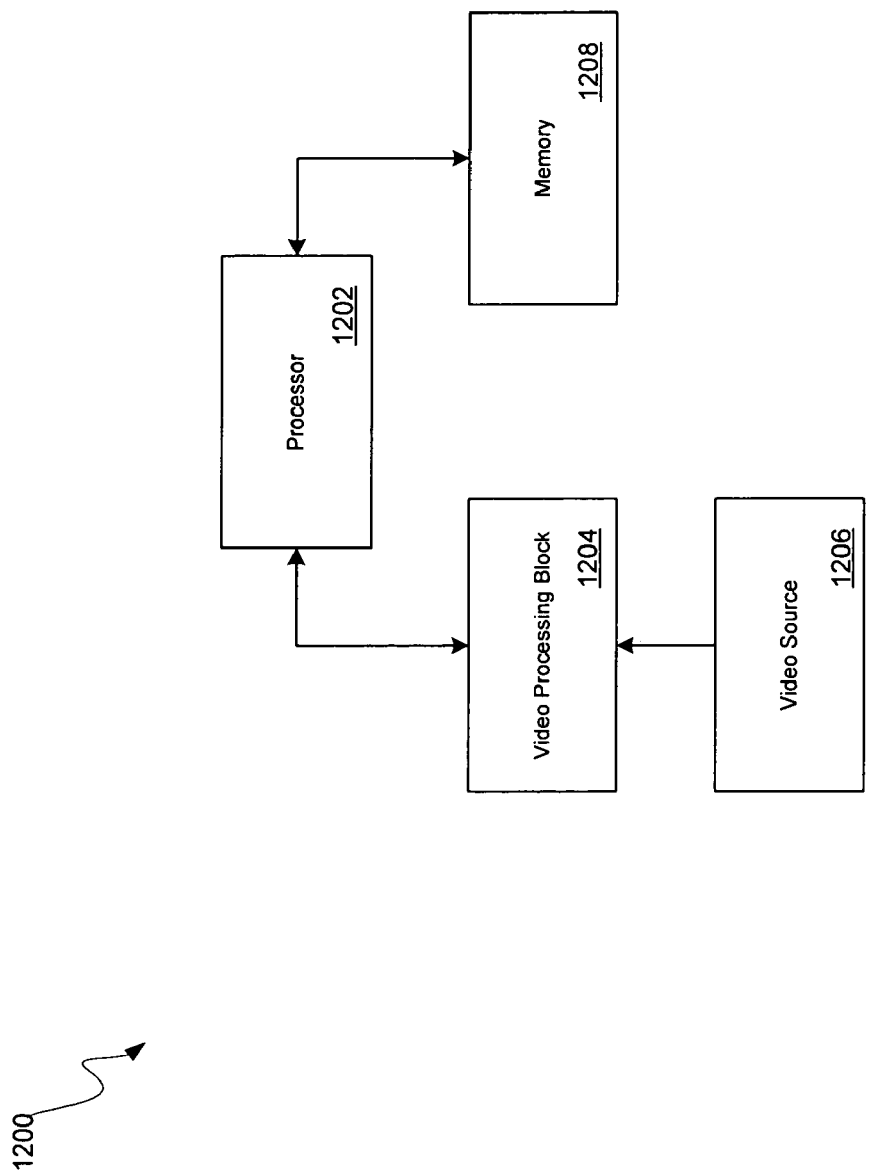
FIG. 12 is a block diagram of an exemplary system for deinterlacing utilizing a polarity change count, in accordance with an embodiment of the invention.

FIG. 12 is a block diagram of an exemplary system for deinterlacing utilizing a polarity change count, in accordance with an embodiment of the invention. Referring to FIG. 12, the exemplary system 1200 may comprise a processor 1202, a video processing block 1204, memory 1208, and a video source 1206. The video source 1206 may comprise suitable circuitry, logic, and/or code and may be adapted to communicate raw video stream data, for example, to the video processing block 1204. The video processing block 1204 may comprise suitable circuitry, logic, and/or code and may be adapted to process the raw video data received from the video source 1206. For example, the video processing block 1204 may be adapted to deinterlace interlaced video data received from the video source 1206. In this regard, the video processing block 1204 may be implemented as a specialized video processing chip or as a specialized video processing function within a chip that also performs other functions.

The processor 1202 may comprise suitable circuitry, logic, and/or code and may be adapted to control processing of video information by the video processing block 1204, for example. The processor 1202 may comprise a system or a host processor. The memory 1208 may be adapted to store raw or processed video data, such as video data processed by the video processing block 1204. Furthermore, the memory 1208 may be utilized to store code that may be executed by the processor 1202 in connection with video processing tasks performed by the video processing block 1204. For example, the memory 1208 may store code that may be utilized by the processor 1202 and the video processing block 1204 for calculating a polarity change count and utilizing the calculated polarity change count during deinterlacing of interlaced video received from the video source 1206.

Figure 13:
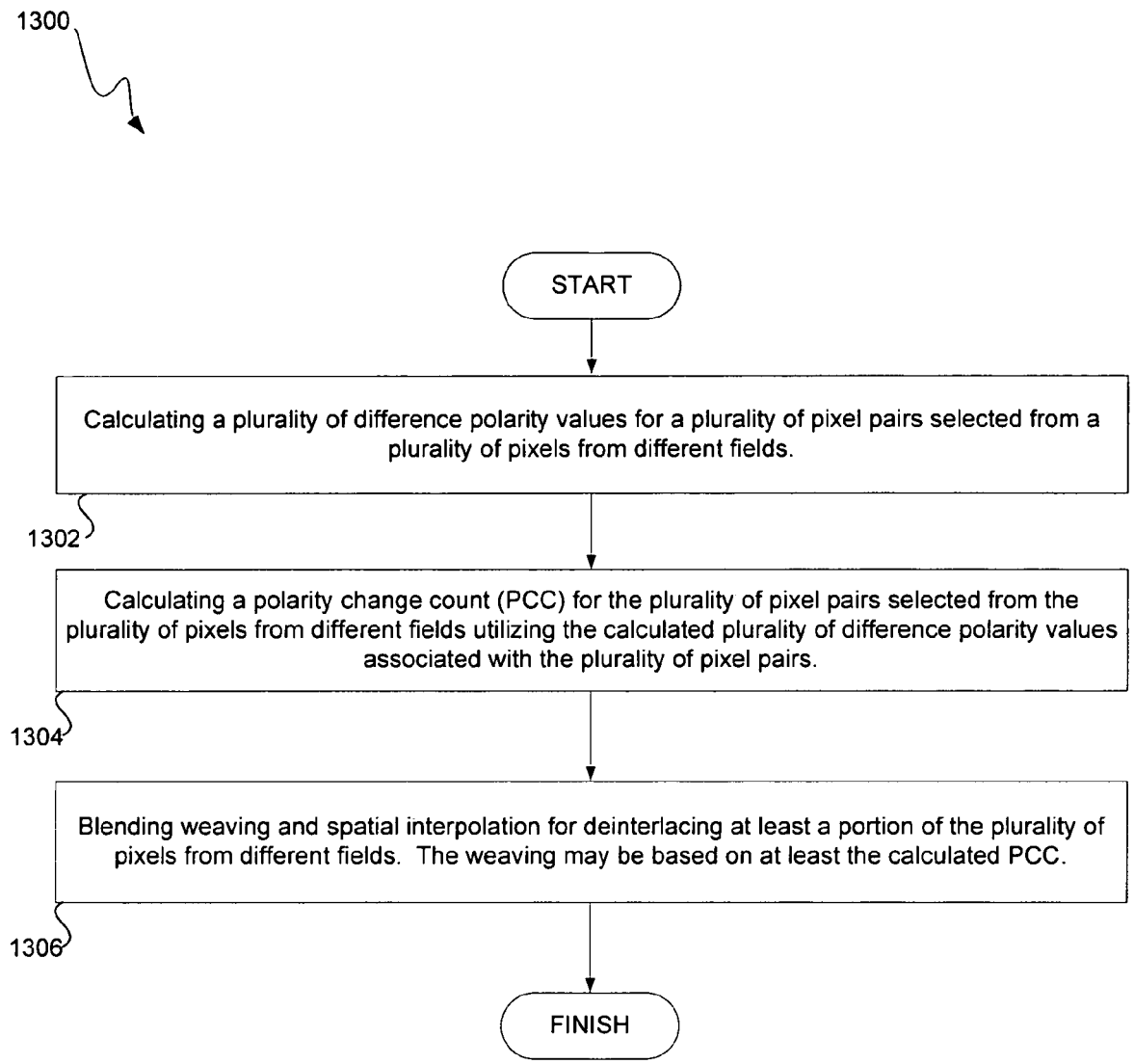
FIG. 13 is a flow diagram illustrating exemplary steps for processing video information, in accordance with an embodiment of the invention.

FIG. 13 is a flow diagram 1300 illustrating exemplary steps for processing video information, in accordance with an embodiment of the invention. Referring to FIG. 13, at 1302, a plurality of difference polarity values may be calculated for a plurality of pixel pairs selected from a plurality of pixels from different fields. At 1304, a polarity change count (PCC) may be calculated for the plurality of pixel pairs selected from the plurality of pixels from different fields utilizing the calculated plurality of difference polarity values associated with the plurality of pixel pairs. At 1306, weaving and spatial interpolation may be blended for deinterlacing at least a portion of the plurality of pixels from different fields. The weaving may be based on at least the calculated PCC.

Accordingly, aspects of the invention may be realized in hardware, software, firmware, or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. Alternatively the entire invention may be integrated in one ASIC. The degree of integration of the system is typically determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing video information, the method comprising:
   calculating a polarity change count (PCC) for a plurality of pixel pairs selected from a plurality of pixels from different fields utilizing a plurality of difference polarity values associated with said plurality of pixel pairs, wherein said calculating of said PCC comprises counting a total number of reversals in said polarity of difference polarity values; and
   deinterlacing at least a portion of said plurality of pixels from different fields based on at least said calculated PCC.

2. The method according to claim 1, comprising calculating said plurality of difference polarity values for said plurality of pixel pairs selected from said plurality of pixels from different fields.

3. The method according to claim 2, comprising calculating at least one difference in amplitude of at least one of said selected pixel pairs for said calculating said plurality of difference polarity values.

4. The method according to claim 1, wherein said plurality of pixels from different fields comprise a plurality of adjacent pixels from a plurality of woven fields.

5. The method according to claim 1, wherein said plurality of pixels from different fields are arranged in at least one vertical column.

6. The method according to claim 1, comprising, if an absolute value of a difference in amplitude of one of said selected pixel pairs is less than a particular value, excluding a difference polarity value for said one of said selected pixel pairs from said calculating said PCC.

7. The method according to claim 1, comprising blending weaving and spatial interpolation for said deinterlacing said at least said portion of said plurality of pixels from different fields.

8. The method according to claim 7, wherein said blending is based on at least said calculated PCC.

9. The method according to claim 1, comprising calculating a plurality of PCC values for a plurality of other pixel pairs selected from said plurality of pixels from different fields.

10. The method according to claim 9, comprising selecting based on at least said calculated plurality of PCC values, at least a portion of said plurality of pixels from different fields for weaving during said deinterlacing.

11. A machine-readable storage having stored thereon, a computer program having at least one code section for processing video information, the at least one code section being executable by a machine for causing the machine to perform steps comprising:
calculating a polarity change count (PCC) for a plurality of pixel pairs selected from a plurality of pixels from different fields utilizing a plurality of difference polarity values associated with said plurality of pixel pairs, wherein said calculating of said PCC comprises counting a total number of reversals in said polarity of difference polarity values; and
deinterlacing at least a portion of said plurality of pixels from different fields based on at least said calculated PCC.

12. The machine-readable storage according to claim 11, comprising code for calculating said plurality of difference polarity values for said plurality of pixel pairs selected from said plurality of pixels from different fields.

13. The machine-readable storage according to claim 12, comprising code for calculating at least one difference in amplitude of at least one of said selected pixel pairs for said calculating said plurality of difference polarity values.

14. The machine-readable storage according to claim 11, wherein said plurality of pixels from different fields comprise a plurality of adjacent pixels from a plurality of woven fields.

15. The machine-readable storage according to claim 11, wherein said plurality of pixels from different fields are arranged in at least one vertical column.

16. The machine-readable storage according to claim 11, comprising code for excluding a difference polarity value for said one of said selected pixel pairs from said calculating said PCC, if an absolute value of a difference in amplitude of one of said selected pixel pairs is less than a particular value.

17. The machine-readable storage according to claim 11, comprising code for blending weaving and spatial interpolation for said deinterlacing said at least said portion of said plurality of pixels from different fields.

18. The machine-readable storage according to claim 17, wherein said blending is based on at least said calculated PCC.

19. The machine-readable storage according to claim 11, comprising code for calculating a plurality of PCC values for a plurality of other pixel pairs selected from said plurality of pixels from different fields.

20. The machine-readable storage according to claim 19, comprising code for selecting based on at least said calculated plurality of PCC values, at least a portion of said plurality of pixels from different fields for weaving during said deinterlacing.

21. A system for processing video information, the system comprising:
at least one processor that calculates a polarity change count (PCC) for a plurality of pixel pairs selected from a plurality of pixels from different fields utilizing a plurality of difference polarity values associated with said plurality of pixel pairs, wherein said calculating of said PCC comprises counting a total number of reversals in said polarity of difference polarity values; and
said at least one processor deinterlaces at least a portion of said plurality of pixels from different fields based on at least said calculated PCC.

22. The system according to claim 21, wherein said at least one processor calculates said plurality of difference polarity values for said plurality of pixel pairs selected from said plurality of pixels from different fields.

23. The system according to claim 22, wherein said at least one processor calculates at least one difference in amplitude of at least one of said selected pixel pairs for said calculating said plurality of difference polarity values.

24. The system according to claim 21, wherein said plurality of pixels from different fields comprise a plurality of adjacent pixels from a plurality of woven fields.

25. The system according to claim 21, wherein said plurality of pixels from different fields are arranged in at least one vertical column.

26. The system according to claim 21, wherein said at least one processor excludes a difference polarity value for said one of said selected pixel pairs from said calculating said PCC, if an absolute value of a difference in amplitude of one of said selected pixel pairs is less than a particular value.

27. The system according to claim 21, wherein said at least one processor blends weaving and spatial interpolation for said deinterlacing said at least said portion of said plurality of pixels from different fields.

28. The system according to claim 27, wherein said blending is based on at least said calculated PCC.

29. The system according to claim 21, wherein said at least one processor calculates a plurality of PCC values for a plurality of other pixel pairs selected from said plurality of pixels from different fields.

30. The system according to claim 29, wherein said at least one processor selects based on at least said calculated plurality of PCC values, at least a portion of said plurality of pixels from different fields for weaving during said deinterlacing.

* * * * *